United States Patent [19]

Mizuguchi et al.

[11] Patent Number: 5,937,573
[45] Date of Patent: Aug. 17, 1999

[54] MULCHING PAPER SHEET

[75] Inventors: Yoko Mizuguchi; Katsuhiko Sugiyama, both of Ichikawa; Junji Osawa, Kawasaki; Kaichi Hara, Tokyo, all of Japan

[73] Assignee: New Oji Paper Co., Ltd, Tokyo, Japan

[21] Appl. No.: 08/925,065

[22] Filed: Sep. 8, 1997

Related U.S. Application Data

[63] Continuation of application No. 08/593,508, Jan. 30, 1996, abandoned.

[30] Foreign Application Priority Data

Feb. 1, 1995 [JP] Japan .................................. 7-015237

[51] Int. Cl.⁶ ..................................................... A01G 7/00
[52] U.S. Cl. ...................................................... 47/9
[58] Field of Search ........................................... 47/9, 1.01

[56] References Cited

U.S. PATENT DOCUMENTS

| | | | |
|---|---|---|---|
| 1,846,185 | 2/1932 | Cline et al. | 47/9 S |
| 1,870,110 | 8/1932 | Hall | 47/9 S |
| 2,685,150 | 8/1954 | Linehan . | |
| 3,493,464 | 2/1970 | Bowers et al. | 47/9 S |
| 3,810,328 | 5/1974 | Bryan, Jr. . | |
| 3,938,280 | 2/1976 | Vandemark et al. | 47/9 S |
| 3,939,606 | 2/1976 | Vandemark et al. | 47/9 S |
| 5,163,247 | 11/1992 | Weber et al. | 47/9 S |

FOREIGN PATENT DOCUMENTS

| | | | |
|---|---|---|---|
| 000547702 | 6/1993 | European Pat. Off. | 47/9 GC |
| 50-17371 | 6/1975 | Japan . | |
| 51/100447 | 9/1976 | Japan | 47/9 S |
| 0092625 | 7/1980 | Japan | 47/9 S |
| 2501006 | 9/1982 | Japan | 47/9 S |
| 3139216 | 6/1991 | Japan | 47/9 S |
| 40994133 | 3/1992 | Japan | 47/9 SC |
| 5-103553 | 4/1993 | Japan . | |
| 6-62680 | 3/1994 | Japan . | |
| 6245654 | 9/1994 | Japan | 47/9 S |

*Primary Examiner*—Michael J. Carone
*Assistant Examiner*—Joanne C. Downs
*Attorney, Agent, or Firm*—Armstrong, Westerman, Hattori, McLeland & Naughton

[57] ABSTRACT

A mulching paper sheet having satisfactory mechanical strength, elongation, weathering resistance and biodegradation resistance while being used for plant culture, includes a paper sheet substrate formed mainly from a cellulosic pulp; a biodegradation-retarding agent comprising humic acid and/or a water-insoluble metal salt of humic acid and coated on or impregnated in the substrate; and optionally an antimicrobial agent contained in at least the longitudinal side edge portions of the paper sheet substrate.

7 Claims, No Drawings

MULCHING PAPER SHEET

This application is a continuation of application Ser. No. 08/593,508 filed Jan. 30, 1996, abandoned.

BACKGROUND OF THE INVENTION

1. Field of the Invention

The present invention relates to a mulching paper sheet. More particularly, the present invention relates to a mulching paper sheet capable of retaining a satisfactory mechanical strength when being used for plant culture.

2. Description of the Related Art

Mulching paper sheets are used to inhibit growth of weeds and to retain water and warmth in soil. Hitherto, plastic films, for example, polyolefin films, were employed as mulching sheets for plant culture. However, conventional mulching sheets are disadvantageous in that they have no bio-decomposition property and therefore, after use, the waste mulching sheets must be recovered. The recovering operation is a great load on farm workers.

Compared with the plastic mulching sheets, mulching paper sheets are capable of rotting and being decomposed in soil.

There have been many proposals for improving the conventional mulching paper sheets having the above-mentioned advantages.

Conventional mulching paper sheets are, however, disadvantageous in that they are rapidly degraded due to the rotting action of microorganisms in the soil and the degradation action of sunlight including ultraviolet-rays and heat rays, and thus are broken before the growing time of the plant ends.

Since the conventional mulching paper sheets have a relatively low elongation, the mulching paper sheets are often broken when opened and extended. Therefore, a specific finishing process, for example, a crepe treatment or a clupack treatment is applied to the conventional mulching paper sheets to enhance the extensibility of the sheets.

For example, Japanese Examined Patent Publication No. 50-17,371 discloses a process in which a germicide, an insecticide and/or a herbicide is added to a crepe-processed natural kraft paper sheet during the paper sheet-forming process. Japanese Unexamined Patent Publication No. 5-103,553 discloses a process in which a crepe-processed natural kraft paper sheet is coated or impregnated with a silicone resin, and then resin is hardened to impart a waterproofing property to the paper sheet. Also, Japanese Unexamined Patent Publication No. 6-62,680 discloses a process in which a paper sheet is coated or impregnated with carbon black as a light-shielding material or with a chitosan or chitosan derivative which promotes a propagation of soil bacteria salutary to agricultural plants and restricts the propagation of soil bacteria harmful to the agricultural plants.

These conventional processed mulching paper sheets are still disadvantageous in that they have a poor resistance to weathering.

SUMMARY OF THE INVENTION

An object of the present invention is to provide a mulching paper sheet having an enhanced weathering resistance and a satisfactory biodegradation resistance.

The above-mentioned object can be attained by the mulching paper sheet of the present invention which comprises a paper sheet substrate comprising, as a principal component, a cellulosic pulp; and a degradation-retarding agent comprising at least one member selected from the group consisting of humic acid and the salts thereof, and contained in the paper sheet substrate.

In the mulching paper sheet of the present invention, an antimicrobial agent is optionally contained in at least the longitudinal side edge portions of the paper sheet substrate. The antimicrobial agent may be distributed in the entire mulching paper sheet, or only in longitudinal side edge portions of the mulching paper sheet, which portions will be embedded in the soil.

BRIEF DESCRIPTION OF THE DRAWINGS

FIG. 1 is an explanatory cross-sectional profile of a flat high ridge to be mulched by the mulching paper sheet, FIG. 2 is an explanatory cross-sectional profile of a flat low ridge, and FIG. 3 is an explanatory cross-sectional profile of a round ridge.

DESCRIPTION OF THE PREFERRED EMBODIMENTS

The mulching paper sheet of the present invention comprises a paper sheet substrate comprising as a principal component, a cellulosic pulp for example, wood pulp and waste paper pulp, and optionally a synthetic pulp, for example, a polyolefin pulp, and synthetic fibers, and a specific degradation-retarding agent contained in the paper sheet substrate.

The basis weight of the mulching paper sheet of the present invention is not limited to a specific range. Nevertheless, the mulching paper sheet of the present invention usually has a basis weight of 30 to $200 g/m^2$.

Preferably, the paper sheet substrate of the mulching paper sheet of the present invention contains 10 to 88% by weight of waste paper pulp. For example, the paper sheet substrate of the mulching paper sheet of the present invention comprises 10 to 88% by weight of a wood pulp, 10 to 88% by weight of a waste paper pulp and 2 to 20% by weight of a synthetic pulp or synthetic fibers.

When the basis weight of the mulching paper sheet is relatively small, for example, 40 $g/m^2$ or less, the wood pulp is preferably selected from soft wood unbleached kraft pulps (NUKP), to provide a satisfactory mechanical strength for the resultant mulching paper sheet. The waste paper pulp may be a waste corrugated cardboard pulp or a waste newspaper pulp. The use of the waste paper pulp is advantageous not only in promotion of recycling of the pulp material but also in reduction in the cost of the mulching paper sheet production. Generally, an addition of the waste paper pulp results in decrease in the mechanical strength of the resultant mulching paper sheet. However, the incorporation of the specific degradation-retarding agent of the present invention to the paper sheet substrate containing the waste paper pulp advantageously can cause the resultant mulching paper sheet to exhibit a satisfactory mechanical strength. Also, when a crepe treatment is applied, the resultant mulching paper sheet containing the waste paper pulp exhibits an enhanced extensibility.

The synthetic fibers usable for the paper sheet substrate may be selected from polyvinyl alcohol fibers and polyester fibers. Since the synthetic fibers exhibit a lower biodegradation rate than that of the cellulosic pulp, the mulching paper sheet containing the synthetic fibers can maintain a fiber network structure formed from the synthetic fibers over a longer period than that of another paper sheet made from the cellulosic pulp alone. Therefore, the synthetic fiber-containing mulching paper sheet can have a certain mechanical strength even after the cellulosic fibers are biodegraded. When placing the mulching paper sheet in an opened and extended form on the earth, portions of the sheet covering the earth surface are difficult to biodegrade and other portions embedded in the earth are easily biodegraded. Accordingly, the synthetic fibers should be contained at an appropriate rate in the paper sheet substrate so that the portions of the resultant mulching paper sheet covering the earth surface have an enhanced mechanical strength and other portions of the mulching paper sheet embedded in the earth do not leave too much residual synthetic fiber in the earth after the embedded mulching paper sheet portions are rotted away. Accordingly, the synthetic fibers are preferably contained in a content of 2 to 20% by weight in the paper sheet substrate. If the content of the synthetic fibers is less than 2% by weight, the effect of the synthetic fibers in enhancing the mechanical strength of the resultant mulching paper sheet may be insufficient, and a content of the synthetic fiber of more than 20% by weight causes a residual amount of the non-rotted synthetic fibers in the earth after the mulching paper sheet is rotted away to be too large and thus the residual synthetic fibers must be removed from the earth for repeated cultivation of the same crop on the same ground.

Generally, the mulching paper sheet is required to exhibit a satisfactory weathering resistance in the portions thereof covering the earth and a satisfactory resistance to biodegradation in the portions thereof embedded in the earth over the period necessary for cultivation, and a satisfactory mechanical strength for opening and extending on the earth.

In the mulching paper sheet of the present invention, a degradation-retarding agent comprising at least one member selected from the group consisting of humic acid and the salts thereof is contained in the paper sheet substrate.

Humic acid and humic acid salts serve as ultraviolet ray-absorbers, exhibit a high resistance to high temperature and to heat rays, and have a high water resistance. Therefore, the specific degradation-retarding agent of the present invention effectively enhances the weathering resistance of the mulching paper sheet and retards the degradation of the mulching paper sheet. Also, the specific degradation-retarding agent of the present invention enhances the water resistance of the resultant mulching paper sheet, and thus, even when brought into contact with wet soil, the mulching paper sheet of the present invention exhibits a higher mechanical strength than that of the conventional mulching paper sheet.

Humic acid and the salts thereof can be prepared by subjecting a coal material having a low degree of coalification, for example, lignite or brown coal to an oxidation treatment and then neutralizing the oxidation product with an alkali. The humic acid is insoluble in water. The humic acid salts of ammonia and alkali metals are soluble in water. The humic acid chelate-reacts with di- or more valent metals to form water insoluble salts thereof.

In the mulching paper sheet of the present invention, the degradation-retarding agent is provided by converting a water-soluble salt of humic acid to a water-insoluble humic compound selected from the group consisting of humic acid and di- or more valent metal salts of humic acid, during paper-forming procedures.

For example, in a process for producing the mulching paper sheet of the present invention, an aqueous pulp slurry is prepared from a paper-forming fibrous material comprising, as a principal component, a cellulosic pulp, for example, wood pulp and/or waste paper pulp, and a water soluble ammonium humate, and is subjected to a paper-forming procedure in which a wet paper sheet is formed from the aqueous pulp slurry and then dried at an elevated temperature, for example, 100 to 140° C., during the paper-forming procedures the water-soluble ammonium humate being converted to humic acid which is insoluble in water, and ammonia which evaporates from the mulching paper sheet.

In another process for producing the mulching paper sheet of the present invention, an aqueous pulp slurry is prepared from a paper-forming fibrous material comprising, as a principal component, a cellulosic pulp, a water soluble salt of humic acid with an alkali metal, for example, sodium or potassium, and a water soluble salt of di- or more valent metal, for example, aluminum, iron or copper.

The water-insoluble di- or more metal salt may be selected from aluminum sulfate, iron sulfate and copper sulfate. The resultant aqueous pulp slurry containing the water soluble alkali metal salt of humic acid and the water-soluble di- or more valent metal salt is subjected to paper-forming procedures in which a wet paper sheet is formed from the aqueous pulp slurry, is then dried and, during the paper-forming procedures, the water-soluble alkali metal salt of humic acid is converted to a water insoluble salt of humic acid with the di- or more valent metal.

In the aqueous pulp slurry, the water-soluble salt of humic acid is contained preferably in a concentration of 0.05 to 15% by weight, more preferably 1 to 5% by weight. Also, the water-soluble salt of the di- or more valent metal is contained in a concentration sufficient to convert the water-soluble humic acid salt to the corresponding water-insoluble di- or more valent metal salt of humic acid and to maintain the pH value of the aqueous pulp slurry at a desired level.

In still another process for producing the mulching paper sheet of the present invention, an aqueous solution of ammonium humate preferably in a concentration of 0.05 to 15% by weight, more preferably 1 to 5% is applied to the paper sheet substrate, for example, by coating at least one surface of the paper sheet substrate therewith or impregnating the paper sheet substrate therewith and drying, preferably at a temperature of 130 to 160° C., to convert the ammonium humate to humic acid and ammonia which is evaporated away.

In a further process for producing the mulching paper sheet of the present invention, an aqueous solution containing a water-soluble salt of humic acid with an alkali metal preferably in a concentration of 0.05 to 15% and a water soluble salt of a di- or more valent metal, for example, aluminum sulfate, iron sulfate or copper sulfate, preferably in a concentration of 1 to 10%, is applied to the paper sheet substrate by, for example, impregnating the paper sheet substrate with the aqueous solution or coating at least one surface of the paper sheet substrate with the aqueous solution, and dried preferably at a temperature of 130 to 160° C., to convert the water soluble alkali metal salt of humic acid metal to a water-insoluble salt of humic acid with the di- or more valent metal.

In the mulching paper sheet of the present invention, the degradation-retarding agent is preferably present in a content of 0.05 to 15%, more preferably 1 to 5%, based on the weight of the paper sheet substrate.

The humic acid or the salts thereof can be gradually biologically decomposed. Therefore, after cropping of the resultant plant, the mulching paper sheet of the present invention is cut and mixed in the soil, then sufficiently decomposed. Therefore, the decomposed mulching paper sheet does not affect the next cultivation.

In the mulching paper sheet of the present invention, an antimicrobial agent is optionally contained partially or entirely in the paper sheet substrate. In an embodiment, the antimicrobial agent is contained only in longitudinal side edge portions of the paper sheet substrate. In the practical use of the mulching paper sheet for a plant cultivation, the longitudinal side edge portions of the mulching paper sheet are embedded in the soil. The antimicrobial agent serves to prevent or retard the microbial degradation of the portions brought into contact with the soil. Usually, the longitudinal side edge portions of the mulching paper sheet in which the antimicrobial agent is contained have a width of 5 to 30 cm. When the width is less than 5 cm, the longitudinal side edge portions of the mulching paper sheet which are embedded in the soil may not be sufficiently protected by the antimicrobial agent. Also, even if the width is made more than 30 cm, a portion of the antimicrobial agent applied to the mulching paper sheet may be consumed purposelessly.

The antimicrobial agent may be selected from a group consisting of mildew-proofing agent and antifungus agents. The middew-proofing agents include, for example, 2,4,5,6-tetrachloroisophthalonitrile and the antifungus agents include, for example, alkylpolyaminoethylglycine.

The antimicrobial agent can be contained in the mulching paper sheet by conventional methods. For example, the antimicrobial agent is added, together with the degradation-retarding agent, to the aqueous pulp slurry.

In another example, the antimicrobial agent is coated on the entire surface or portions of the surface of the mulching paper sheet by conventional coating methods. Especially, the antimicrobial agent is coated or printed only on the longitudinal side edge portions of the mulching paper sheet surface.

In still another example, the mulching paper sheet is impregnated with a solution, dispersion or emulsion of the antimicrobial agent by an immersion method, and then dried.

The mulching paper sheet of the present invention exhibits a reduced degradation property for ultraviolet rays and heat during the plant cultivation. Also, when the antimicrobial agent is contained, the resultant mulching paper sheet of the present invention exhibits an enhanced resistance to microbial degradation during the plant cultivation. After the plant cultivation is finished, the mulching paper sheet can be completely decomposed in the soil without affecting the soil for next cultivation.

The mulching paper sheet is extended by hand or by an extending machine. In the hand extending, ridges are formed before the extending, and then the mulching paper sheet is extended on the ridges by hand. In the mechanical, extending, while the ridges are being formed, the mulching paper sheet is simultaneously extended on the ridges. Accordingly, in the hand extending, the mulching paper sheet can be extended under a uniform tension without breakage of the sheet. Compared with this, in the mechanical extending, an extending stress may be unevenly applied to the mulching paper sheet. Especially, both the side edge portions of the mulching paper sheet are stressed under a large tension. Therefore, when the mulching paper sheet has a low stretchability, the sheet may be broken in the mechanical extending operation.

In green house cultivation, the mulching paper sheet is usually extended by hand, and thus is not required to have a high stretchability. However, in open air cultivation, the extending of the mulching paper sheet is usually carried out by using an extending machine and thus the mulching paper sheet must have a high stretchability.

When the mulching paper sheet is produced by using a wire paper machine, the resultant paper sheet has an ultimate elongation of less than 3% in the longitudinal direction and thus is unsuitable to be mechanical extended in open air cultivation.

The mulching paper sheet having an ultimate elongation of 3 to 20% can be produced by applying a crepe treatment or a Clupak treatment to the mulching paper sheet. In the Culpak treatment, a difference between the feed speed and the delivery speed of the Clupak compactor device is controlled so as to adjust the ultimate elongation to a desired level. In the crepe treatment, a difference between the speed of a Yankee dryer and the speed of a winding reel is controlled so as to adjust the ultimate elongation to a desired value. The ultimate elongation of the crepe or Culpak treated sheet is preferably in the range of from 3 to 20% in the longitudinal direction. If the ultimate elongation is less than 3%, the resultant mulching paper sheet may be broken in the mechanical extending operation. Also, even if the ultimate elongation is increased to more than 20%, the improvement in handling is saturated.

EXAMPLES

The present invention will be further explained by the following examples which are merely representative and do not limit the scope of the present invention in any way.

Example 1

An aqueous pulp slurry was prepared by suspending a solid content having the following composition and in a total concentration of 3% by weight in water.

| Component | Parts by weight |
| --- | --- |
| Unbleached soft wood kraft pulp (*)1 | 55 |
| Wasted corrugated cardboard pulp | 40 |
| Water-insolubilized polyvinyl alcohol fibers (*)2 | 5 |
| Sodium salt of humic acid (*)3 | 4 |
| Sizing agent (*)4 | 0.8 |
| Aluminum sulfate (*)5 | — |

Note:
(*)1 . . . This pulp had a Canadian standard freeness of 350 ml.
(*)2 . . . The fibers had a thickness of 1 denier and a length of 3 mm.
(*)3 . . . This sodium salt of humic acid was available under the trademark of CH—O2, from K. K. Terunaito, and added in the state of a 15% aqueous solution to the slurry.
(*)4 . . . This sizing agent was available under the trademark of Sizepain E, from Arakawa Kagaku K.K.
(*)5 . . . The pH of the pulp slurry was adjusted to 4.5.

The aqueous pulp slurry was subjected to paper-forming procedures using a wire paper machine. The resultant mulching paper sheet had a basis weight of 50g/m$^2$.

The mulching paper sheets were subjected to the following tests.

Test (1)

From the mulching paper sheet, specimens having a length of 25 cm in the longitudinal direction of the paper sheet, and a width of 1.5 cm, were obtained. The specimens were subjected to determinations of dry tensile strength and ultimate elongation in accordance with JIS P8113 and of wet tensile strength in the longitudinal direction in accordance with JIS P8135. The test results are shown in Table 1.

Test (2) (Weathering test)

The mulching paper sheets having a length of 150 cm and a width of 125 cm were mulched on flat high ridges as shown in FIG. 1. In FIG. 1, the ridge 1 had a top width a of 35 cm, a height b of 25 cm and a bottom width c of 45 cm. The mulching paper sheet 2 was placed on the ridge 1 as shown in FIG. 1 and the longitudinal side edge portions 4 of the mulching paper sheet 2 were embedded in the soil 3. In the embedded portions 4, d=5 cm and e=14.5 cm.

The mulching paper sheets were left on the flat high ridges for 30 days to conduct a weathering test. Thereafter, specimens having a length of 25 cm and a width of 1.5 cm were taken from portions of the tested mulching paper sheets which were not embedded in the soil and exposed to sun light. The specimens were subjected to the measurements of the dry tensile strength in the longitudinal direction. The test result is shown in Table 2.

Test (3) (Decay test)

The mulching paper sheets were cut into specimens having a length of 12 cm in the longitudinal direction of the paper sheet and a width of 6 cm.

In a container with a lid, a culture soil having an adjusted water content of 33±1% by weight was placed at a thickness of 2 cm, one of the specimens was placed on the culture soil and then the culture soil was placed on the specimen in a thickness of 2 cm to form a sandwich structure in the container.

The container was closed by the lid and left in a constant low temperature vessel adjusted to a temperature of 30° C. for a decay test, at the stage of 4, 8, 11, 14 or 30 days after the start of the decay test. The decay-tested specimen was taken out from the container, washed with water, and subjected to a measurement of wet tensile strength in the longitudinal direction. The test results are shown in Table 3.

Example 2

A mulching paper sheet was produced and tested by the same procedures as in Example 1, except that the resultant mulching paper sheet was subjected to a Clupak (trade designation) treatment in which the paper sheet was crinkled in a longitudinal shrinkage of 6% to form a crepe-like extensible sheet.

The test results of the resultant extensible mulching paper sheet are shown in Tables 1, 2 and 3.

The resultant extensible mulching paper sheet can be smoothly extended by using an extending machine on flat high ridges as shown in FIG. 1, flat low ridges as shown in FIG. 2 and round ridges as shown in FIG. 3 without breakage.

Example 3

A mulching paper sheet was produced and tested by the same procedures as in Example 1, except that a mildew proofing agent containing, as an effective component, 2,4,5,6-tetrachloroisophthalonitrile was added in an amount of 1.0 part by weight to the solid content of the aqueous pulp slurry.

The test results are shown in Tables 1, 2 and 3.

Example 4

A mulching paper sheet was produced and tested by the same procedures as in Example 3, except that the same Culpak treatment as in Example 2 was applied to the resultant mulching paper sheet.

The test results are shown in Tables 1, 2 and 3.

The resultant extensible mulching paper sheet could be smoothly extended by an extending machine on the flat high ridges of FIG. 1, the flat low ridges of FIG. 2 and the round ridges of FIG. 3, without breakage.

Comparative Example 1

A mulching paper sheet was produced and tested by the same procedures as in Example 1, except that in the preparation of the aqueous pulp slurry, the sodium salt of humic acid was omitted.

The test results are shown in Tables 1 and 3.

Comparative Example 2

A mulching paper sheet was produced and tested by the same procedures as in Example 2, except that in the preparation of the aqueous pulp slurry, the sodium salt of humic acid was omitted.

The test results are shown in Tables 1, 2 and 3.

TABLE 1

| Example No. | | Dry tensile strength in longitudinal direction (kgf/15 mm) | Dry ultimate elongation in longitudinal direction (%) | Wet tensile strength in longitudinal direction (kgf/15 mm) |
|---|---|---|---|---|
| Example | 1 | 4.48 | 1.8 | 1.21 |
|  | 2 | 4.75 | 7.0 | 1.29 |
|  | 3 | 4.52 | 1.9 | 1.24 |
|  | 4 | 4.70 | 7.0 | 1.29 |
| Comparative Example | 1 | 4.36 | 1.9 | 1.24 |
|  | 2 | 4.61 | 7.0 | 1.25 |

TABLE 2

| | | Dry tensile strength in longitudinal direction (kgf/15 mm) | |
|---|---|---|---|
| Example No. | | Before weathering test | After weathering test for 30 days |
| Example | 1 | 4.48 | 3.32 |
|  | 2 | 4.75 | 3.89 |
|  | 3 | 4.56 | 3.22 |
|  | 4 | 4.70 | 3.88 |
| Comparative Example | 1 | 4.36 | 0.97 |
|  | 2 | 4.61 | 1.26 |

TABLE 3

| | | Dry tensile strength in longitudinal direction (kgf/15 mm) | | | | | |
|---|---|---|---|---|---|---|---|
| | | Before decay test | After decay test | | | | |
| Example No. | | | 4 days | 8 days | 11 days | 14 days | 30 days |
| Example | 1 | 4.48 | 2.87 | 2.29 | 1.55 | 0.99 | 0.10 |
|  | 2 | 4.79 | 2.94 | 2.20 | 1.62 | 1.09 | 0.11 |
|  | 3 | 4.36 | 4.23 | 4.11 | 4.07 | 3.96 | 0.90 |
|  | 4 | 4.79 | 4.66 | 4.52 | 4.43 | 4.29 | 1.10 |
| Comparative Example | 1 | 4.36 | 2.36 | 0.81 | 0.16 | 0.14 | 0.06 |
|  | 2 | 4.76 | 2.71 | 0.63 | 0.15 | 0.14 | 0.08 |

As Table 1 clearly indicates, the mulching paper sheets of the present invention containing the humic acid salt and optionally the antimicrobial agent have substantially the same dry and wet tensile strengths and ultimate elongations as those of corresponding conventional mulching paper sheets free from the humic acid salt.

Also, Table 2 clearly shows that the addition of the humic acid salt significantly enhance the weathering resistance or sunlight resistance of the resultant mulching paper sheets of the present invention, in comparison with that of the conventional mulching paper sheets.

Further, Table 3 clearly shows that the mulching paper sheets of Examples 1 and 2 containing the humic acid salt exhibited a higher decay resistance within at least 14 days from the start of the decay test, than that of conventional mulching paper sheets of Comparative Examples 1 and 2, and the mulching paper sheets of Examples 3 and 4 containing the humic acid salt and the antimicrobial agent exhibited an significantly enhanced decay resistance within at least 30 days of the decay test.

We claim:

1. A mulching paper sheet comprising a paper sheet substrate comprising as a principal component, a cellulosic pulp and 0.05 to 15%, based on the weight of the paper sheet substrate, of a degradation-retarding agent comprising at least one member selected from water-insoluble humic acid salts of aluminum, iron and copper, which humic acid salts serve as ultraviolet ray-absorbers and exhibit a high resistance to high temperature, to heat rays and to water, the mulching paper sheet being crinkled and having an ultimate elongation of 3 to 20% in the longitudinal direction thereof.

2. The mulching paper sheet as claimed in claim 1, wherein the paper sheet substrate contains 10 to 88% by weight of a waste paper pulp.

3. The mulching paper sheet as claimed in claim 1, wherein an antimicrobial agent is contained in the paper sheet substrate.

4. The mulching paper sheet as claimed in claim 3, wherein the antimicrobial agent is contained only in longitudinal side edge portions of the paper sheet substrate.

5. The mulching paper sheet as claimed in claim 4, wherein the longitudinal side edge portions of the mulching paper sheet in which the antimicrobial agent is contained have a width of 5 to 30 cm.

6. The mulching paper sheet as claimed in claim 3, wherein the antimicrobial agent comprises at least one member selected from the group consisting of mildew proofing agents and antifungus agents.

7. The mulching paper sheet as claimed in claim 1, wherein the degradation-retarding agent is provided by converting a water-soluble salt of humic acid to a water-insoluble humic compound selected from the group consisting of humic acid and di- or more valent metal salts of humic acid during a paper-forming procedure.

* * * * *